(12) United States Patent
De Jong et al.

(10) Patent No.: US 12,681,238 B2
(45) Date of Patent: Jul. 14, 2026

(54) CONFIGURABLE OPTICAL DEVICES HAVING AN OPTICAL SPLITTER AND DUPLEX CONNECTOR

(71) Applicant: CORNING RESEARCH & DEVELOPMENT CORPORATION, Corning, NY (US)

(72) Inventors: Michael De Jong, Colleyville, TX (US); Carmi Shapira, D.N. Modiin (IL); Eric Stephan ten Have, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 366 days.

(21) Appl. No.: 18/139,667

(22) Filed: Apr. 26, 2023

(65) Prior Publication Data

US 2023/0288646 A1 Sep. 14, 2023

Related U.S. Application Data

(63) Continuation of application No. PCT/US2021/056393, filed on Oct. 25, 2021.
(Continued)

(51) Int. Cl.
*G02B 6/28* (2006.01)
*G02B 6/35* (2006.01)
(Continued)

(52) U.S. Cl.
CPC ......... *G02B 6/2804* (2013.01); *G02B 6/3548* (2013.01); *G02B 6/44715* (2023.05);
(Continued)

(58) Field of Classification Search
None
See application file for complete search history.

(56) References Cited

U.S. PATENT DOCUMENTS

| | | | | | |
|---|---|---|---|---|---|
| 5,475,781 | A | * | 12/1995 | Chang | G02B 6/3879 385/76 |
| 5,933,555 | A | * | 8/1999 | Shen | G02B 6/2726 385/11 |

(Continued)

OTHER PUBLICATIONS

International Search Report and Written Opinion of the International Searching Authority; PCT/US2021/056393; dated Feb. 11, 2022; pp. 17; European Patent Office.

*Primary Examiner* — Jerry Rahll
(74) *Attorney, Agent, or Firm* — Michael E. Carroll, Jr.

(57) ABSTRACT

Optical devices including an optical splitter and a duplex optical connector are disclosed. In one embodiment, an optical device includes an optical splitter having an input, a network output, and a pass-through output, wherein the optical splitter is configured to split an input signal received at the input into a network optical signal at the network output and a pass-through output signal at the pass-through output. The optical device further includes a duplex connector having an input connection point and a pass-through connection point, an input waveguide optically coupling the input connection point to the input of the optical splitter, and a pass-through waveguide optically coupling the pass-through connection point to the pass-through output of the optical splitter.

37 Claims, 14 Drawing Sheets

Related U.S. Application Data

(60) Provisional application No. 63/107,928, filed on Oct. 30, 2020.

(51) Int. Cl.
  *G02B 6/44* (2006.01)
  *G02B 6/12* (2006.01)
  *G02B 6/38* (2006.01)
  *G02B 6/42* (2006.01)

(52) U.S. Cl.
  CPC .... *G02B 2006/1215* (2013.01); *G02B 6/3885* (2013.01); *G02B 6/4204* (2013.01); *G02B 6/44465* (2023.05); *G02B 6/4453* (2013.01)

(56) References Cited

U.S. PATENT DOCUMENTS

| | | | | |
|---|---|---|---|---|
| 10,732,370 B2 * | 8/2020 | Van Baelen | .......... | G02B 6/445 |
| 10,862,582 B1 * | 12/2020 | L'Heureux | .......... | H05B 45/22 |
| 2002/0145776 A1 * | 10/2002 | Chow | ............... | H04J 14/0241 |
| | | | | 398/31 |
| 2003/0063833 A1 * | 4/2003 | Gonthier | ............. | G02B 6/2786 |
| | | | | 385/11 |
| 2004/0208447 A1 * | 10/2004 | Ramadan | ............... | G02F 1/025 |
| | | | | 385/24 |
| 2004/0208506 A1 * | 10/2004 | Kinoshita | .......... | H04J 14/0291 |
| | | | | 398/19 |
| 2005/0282413 A1 * | 12/2005 | Israel | .................. | G02B 6/4261 |
| | | | | 439/76.1 |
| 2006/0233506 A1 * | 10/2006 | Noonan | .............. | G02B 6/3885 |
| | | | | 385/100 |
| 2008/0124075 A1 * | 5/2008 | Xu | .................... | H04Q 11/0067 |
| | | | | 398/25 |
| 2008/0292310 A1 * | 11/2008 | Li | ....................... | H04J 14/0205 |
| | | | | 398/5 |
| 2009/0214163 A1 * | 8/2009 | Lu | ......................... | G02B 6/266 |
| | | | | 156/212 |
| 2009/0269054 A1 * | 10/2009 | Smith | ................... | H04B 10/27 |
| | | | | 398/25 |
| 2013/0004122 A1 * | 1/2013 | Kingsbury | .......... | G02B 6/4471 |
| | | | | 29/877 |
| 2014/0072297 A1 * | 3/2014 | Thompson | ........ | H04B 10/0731 |
| | | | | 398/16 |
| 2015/0016788 A1 * | 1/2015 | Buff | ................... | G02B 6/4472 |
| | | | | 385/100 |
| 2017/0123175 A1 * | 5/2017 | Van Baelen | ........ | G02B 6/4457 |

* cited by examiner

162

163A

163B

200

231

230

248

249A

249C

249C

249D

249E

249F

249G

249H

1x8

262

263B

263A

252

260

270

279

274

60/40%

251

242

253

273

275

257A-257H

CONFIGURABLE OPTICAL DEVICES HAVING AN OPTICAL SPLITTER AND DUPLEX CONNECTOR

CROSS-REFERENCE TO RELATED APPLICATIONS

This application is a continuation of International Application No. PCT/US2021/056393 filed on Oct. 25, 2021, which claims the benefit of priority of U.S. Provisional Application Ser. No. 63/107,928 filed on Oct. 30, 2020, the content of which is relied upon and incorporated herein by reference in its entirety.

BACKGROUND

The present disclosure is directed to optical devices of an optical communication network and, more particularly, optical devices having an optical splitter and a duplex connector to pass an input optical signal and a pass-through optical signal at an access point of an optical distribution network.

Optical fiber is increasingly being used for a variety of applications, including, but not limited to, broadband voice, video, and data transmission. As bandwidth demands increase, optical fiber is migrating toward subscribers in outdoor communication networks such as in fiber to the premises applications such as FTTx and the like.

Optical communication networks commonly employ a daisy-chain architecture, where an optical signal is sequentially tapped-off at access points along a distribution cable. At each access point, the optical signal is split such that a percentage of the optical signal is split amongst subscribers and another percentage is provided further downstream to the next access point. Optical splitters having different splitting ratios are used to split the optical signal. For example, optical splitters in a daisy-chain may have 90%/10% (i.e., 10% of the signal provided to a plurality of subscribers and 90% provided to the next optical splitter) 80%/20%, 70%/30%, and 60%/40% splitting ratios. Each one of these optical splitters requires different components to provide the desired splitting ratio. Thus, in this example, six individual parts need to be manufactured, inventoried, stored, and transported by the installation team. Many different stock keeping units (SKU) add cost and complexity to building optical communication networks.

Additionally, daisy-chain optical networks require breaking up a distribution optical fiber such that optical fiber segments optically couple adjacent access points. This requires a craft to make two optical connections (i.e., one to provide an input optical signal to the downstream multiport, and a pass-through signal traveling the opposite direction back to the distribution optical fiber and toward the next access point). These optical connections may be made by optical connectors, or by splicing optical fibers together. Both options may slow the craft down in making the requisite multiple optical connections.

SUMMARY

The present disclosure is directed to optical devices, such as cable assemblies, multiport devices or cabinets, having a splitting ratio that is either configurable in the field. Therefore, rather than having multiple large cable assemblies to manufacture, inventory and store, only one part number is needed. The craft may take one optical device and add it to any point in the optical network, which adds significant flexibility. The reduced number of SKUs further reduces the cost to build optical communication networks.

One aspect of the disclosure is directed to an optical device including an optical splitter having an input, a network output, and a pass-through output, wherein the optical splitter is configured to split an input signal received at the input into a network optical signal at the network output and a pass-through output signal at the pass-through output. The optical device further includes a duplex connector having an input connection point and a pass-through connection point, an input waveguide optically coupling the input connection point to the input of the optical splitter, and a pass-through waveguide optically coupling the pass-through connection point to the pass-through output of the optical splitter.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

Embodiments of the present disclosure are directed to optical devices, such as multiport devices, that are field-configurable such that a power splitting ratio may be established in the field, rather than at the factory. As described in detail below, embodiments reduce manufacturing and inventory costs, among other benefits. Additionally, embodiments incorporate a duplex connector in a splitter device such that two optical connections are not required to be made to make connections for input optical signals and a pass-through output optical signals. It should be understood that, although the optical devices are described herein in the context of multiport devices, embodiments may be configured as other optical devices that employ optical splitters. Thus, embodiments are not limited to multiport devices.

Optical communication networks rely on optical fiber cables to communicate data by way of optical signals. Fiber cable installation in sparsely populated rural areas is an especially expensive undertaking. Long lengths of fiber optic cable serve a small population. The cable material and installation costs are divided by a low population of end-users.

Therefore, an architecture which maximizes the number of users served by each fiber strand in the distribution cable may be attractive. Obviously, the more users that can be served by each fiber strand, allows the material and installation costs to be divided among that many more users.

Figure 1:
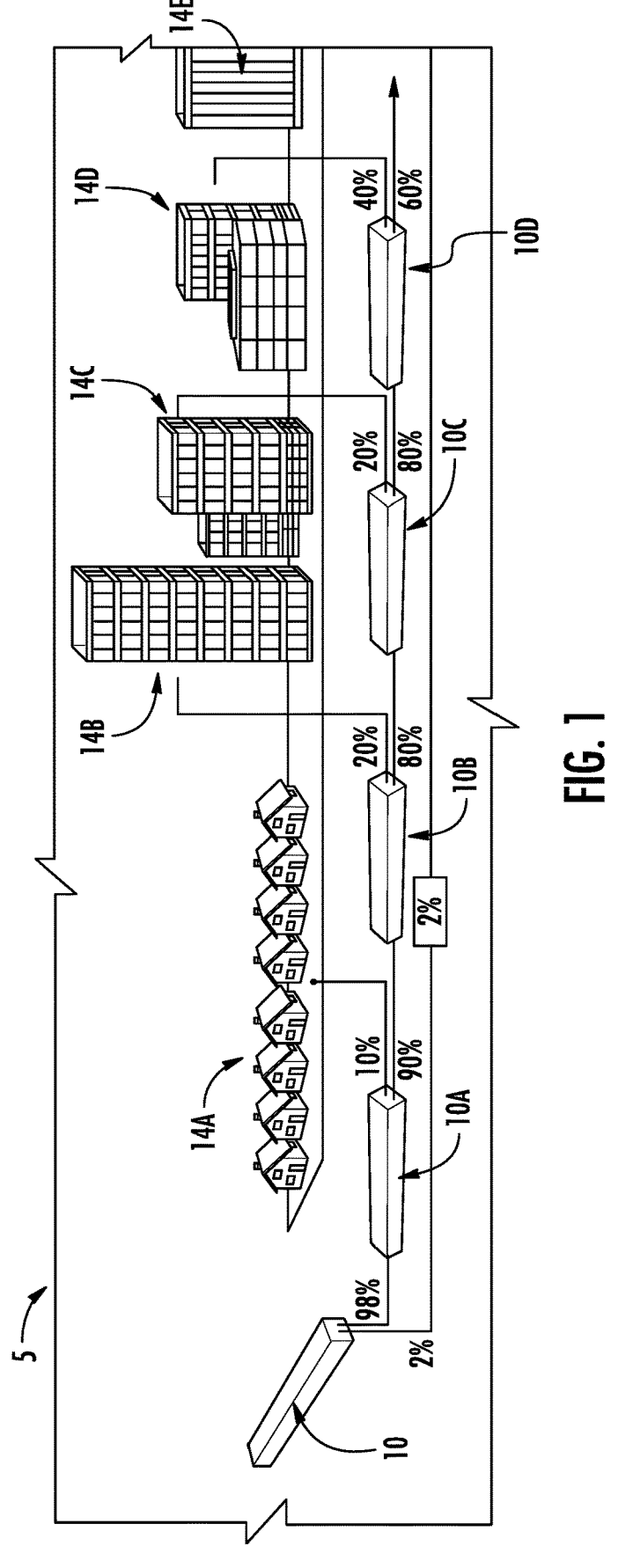
FIG. 1 illustrates an example optical communication network.

A daisy-chained tap fiber to the x (FTTx) in the optical communication network 5 as shown in FIG. 1 is a solution for optical communication network installation, such as those in rural areas. An optical line termination launches a high-power optical signal into a single fiber strand of a multifiber distribution cable. In the illustrated example, a first 1×2 optical splitter 10 splits the high-power optical signal into a first optical signal that is 98% of the power of the high-power optical signal that is passed to a next optical splitter 10A, and a second optical signal that is 2% of the power of the high-power optical signal to be used for monitoring purposes by a monitoring system 14E.

A plurality of asymmetric 1×2 tap optical splitters 10A-10D (also known as tap couplers) are inserted along the length of a given fiber strand of the distribution cable to tap-off a portion of the optical power to feed sets of users 14A-14D along the length of the distribution cable. It is noted that FIG. 1 only illustrates how the daisy chain distributes power to the various sets of users 14A-14D over a single fiber strand. However, the distribution cable (which is not shown in the figure) generally contains multiple fiber strands.

Generally, the power tapped off at each tap point is less than 50% and the power that continues downstream on the distribution cable is greater than 50%. Due to the uneven distribution of power between the two optical splitter output ports, the optical splitters are referred to as "asymmetric optical splitters" or "unbalanced optical splitters." However, it should be understood that a 50%/50% 1×2 optical splitter may be used.

Note that the distribution of the optical power between the two output ports of the optical splitters 10A-10D is most unbalanced at the first drop point and gradually approaches a more balanced distribution at the last optical splitter in the chain. This is because the minimum power required by each of the sets of users 14A-14D along the chain is identical, however the total optical power available in the chain is gradually being siphoned off at each subsequent optical splitter/tap point as the daisy-chain progresses downstream. As a result, each subsequent optical splitter/tap point in the daisy-chain needs to tap-off a larger percentage of the total power in order to keep the power to the end nodes constant.

The tapped optical signal exiting the optical splitter is then split again to be evenly provided to individual users. For example, the 10% optical signal is split again and provided to individual users. The optical splitters 10A-10D may be provided in a multiport device that includes not only a 1×2 optical splitter, but also an M×N optical splitter. For example, an eight output multiport device may utilize a 1×8 splitter to split the 10% optical signal eight ways. Fiber optic cable assemblies are connected to the output ports of the multiport device and delivered to individual users.

Each optical splitter has a tolerance on maximum loss due to changes in loss over the range of optical wavelengths used in the system, aging, manufacturing tolerances and environmental factors such as temperature. The splitting ratio and/or optical loss may vary as a result of any of these factors. An optical budget is calculated for each end node considering the worst-case loss for each optical splitter. Being that the total optical budget available is a given, any additional dB that needs to be subtracted from the total budget due to large tolerances of the components will result in compromises on the allowable number of drop points along the daisy chain.

For example, using very tightly tolerance components which maintain an almost constant loss (even over wavelength and environmental conditions) may afford up to six drop points. At the other extreme, components with losses that vary greatly over temperature and wavelength may only allow three drop points along the chain. Thus, optical splitters which can maintain a constant and predictable low loss over temperature, wavelength and environmental stresses are best positioned to deliver the most drop points along the daisy chain.

Therefore, there is value in using optical splitter components which have tighter tolerances to maximize the number of attainable drop points for a given optical budget. This tradeoff between number of attainable drop points and tolerances of components should ideally be optimized to attain the best combination.

Still referring to FIG. 1, optical splitters 10, 10A-10D each have a different power splitting ratio. Thus, internal components of the optical splitters 10, 10A-10D are different and therefore require the manufacture to produce and inventory many unique part numbers, which adds cost. For example, if six different asymmetric splitter ratio values are employed over the length of a distribution cable in a daisy-chain, then six unique stock keeping units (SKU) must be created, inventoried, and carried by the craft during installation or maintenance.

Embodiments of the present disclosure provide optical devices including an optical splitter with a "loop back" pass-through waveguide terminated in a duplex connector along with an input waveguide. The duplex connector enables a craftsman to couple to an access point with only one optical connector rather than two. In effect, the pass-through waveguide immediately returns the pass-through optical signal to the distribution fiber without another connector or optical cable assembly.

Embodiments also include a splitter cassette housing having different power split ratios that the craft may install in the field either in a cable assembly or a multiport to field-configure the optical power split ratio of the multiport. The ability to field-configure the optical power split ratio means that multiple variations of the large multiport device do not need to be carried by the craft or inventoried.

Various embodiments of optical devices and methods are described in detail below.

Figure 2:
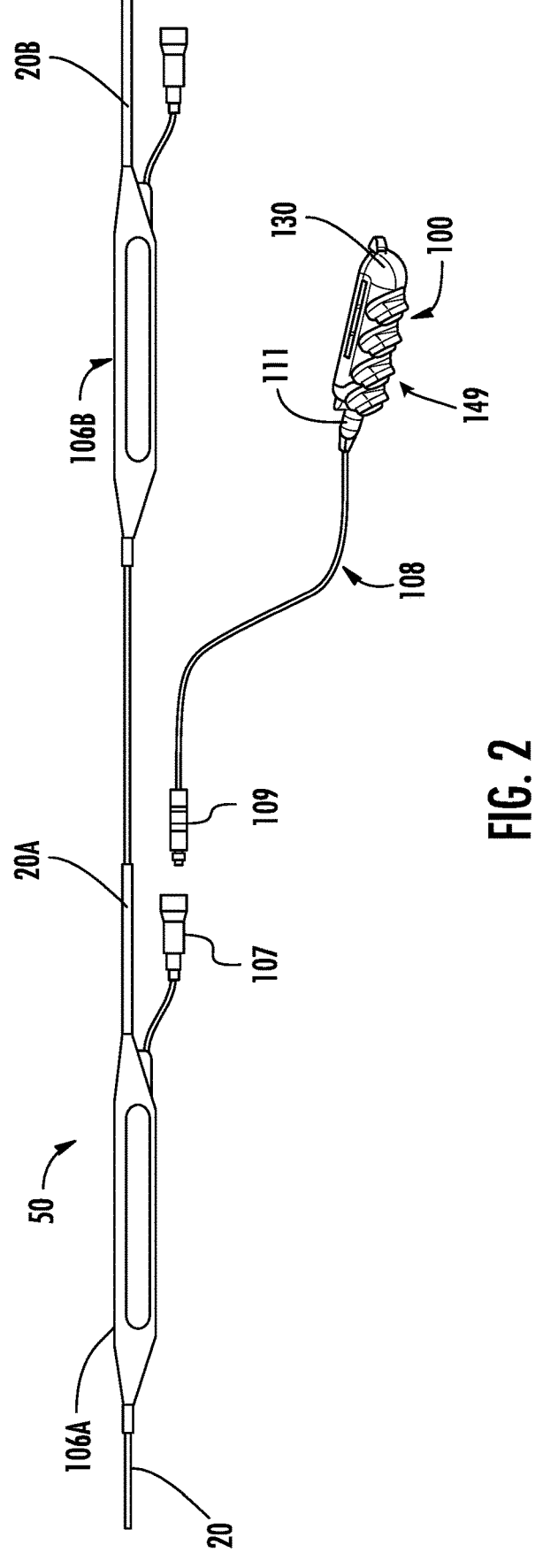
FIG. 2 illustrates a partial view of an example optical communication network according to one or more embodiments described and illustrated herein.

Referring to FIG. 2, an example daisy-chain implementation of an optical communication network 50 is illustrated. The optical communication network 50 includes a distribution cable 20 and a plurality of pre-terminated access points 106A, 106B that are engineered into the distribution cable 20. Any number of access points may be provided (e.g., six access points). The access points 106A, 106B provide a break in an optical fiber within the distribution cable 20. An optical fiber within a connectorized tether assembly 107 is optically coupled to the broken optical fiber at the access point 106A, 106B. As used herein, the phrases "optically coupled" and "in optical communication with" mean that optical signals pass between two components.

An intermediate cable assembly 108 has a first connector 109 that connects to the tether assembly 107 and a second connector 111 that connects to an optical device, which in the illustrated embodiment is configured as a multiport 100 or cabinet. The intermediate cable assembly 108 comprises an input optical fiber and a pass-through optical fiber (not shown). An input optical signal is provided to the input optical fiber of the intermediate cable assembly 108 through the tether assembly 107. The pass-through optical fiber receives a pass-through optical signal (i.e., a tapped optical signal) from a selected optical splitter within the optical device, and provides the pass-through optical signal to the distribution cable 20 by way of the tether assembly 107. The pass-through optical signal is then propagated downstream to the next access point over the distribution cable 20. For example, a pass-through signal after a first access point 106A is provided as an input to an optical device of a second access point 106B.

Figure 3:
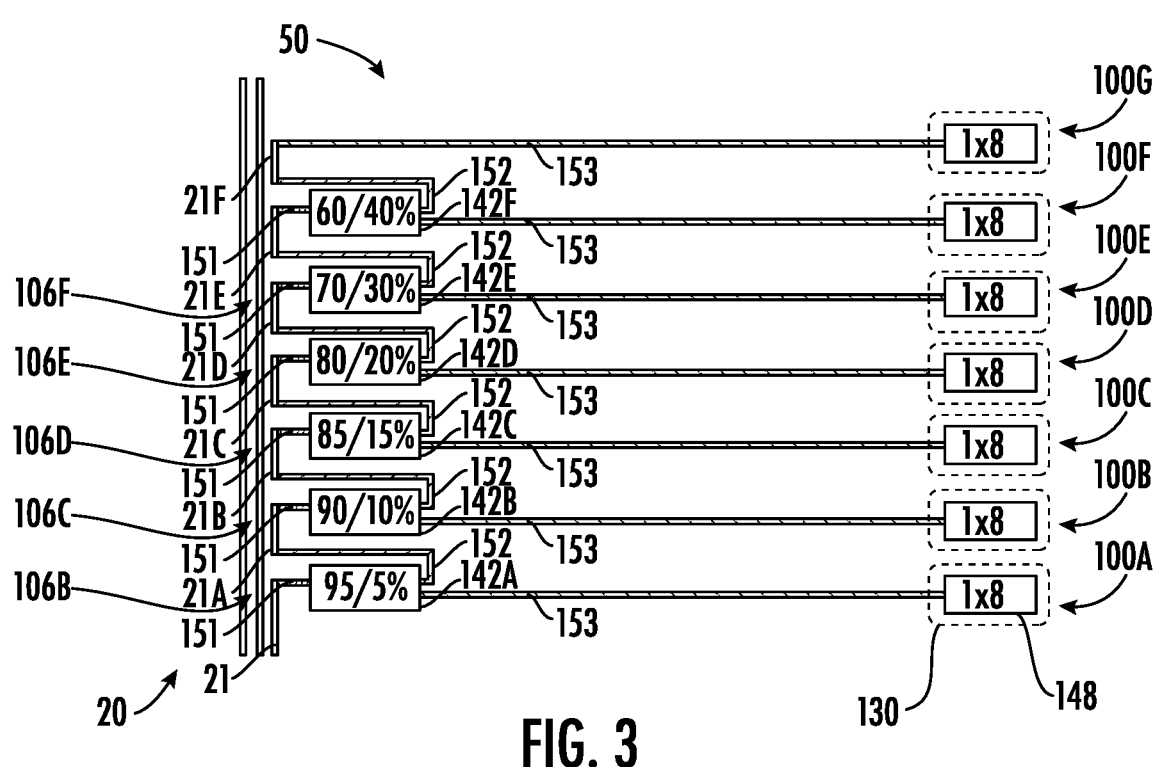
FIG. 3 illustrates example optical splitters of an example optical communications network according to one or more embodiments described and illustrated herein.

FIG. 3 schematically illustrates internal components of an example optical communications network 50 (i.e., a distribution network). A distribution cable 20 includes a plurality of optical fibers, such as optical fiber 21. In a daisy-chained optical network, the optical fiber 21 is broken into segments at each access point, such as segments 21A-21F at access points 106A-106F.

An optical splitter 142A-142F is provided at each access point to split an optical signal at the access points 106A-106F into a network optical signal that is propagated toward a 1×N optical splitter and subscribers, and a pass-through optical signal that is propagated toward the next access point. In the embodiment of FIG. 3, each optical splitter 142A-142F is an asymmetric optical splitter (also known as "unbalanced") because the first optical signal and the second optical signal have different power levels. However, it should be understood that embodiments may also employ optical splitters having a 50-50 splitting ratio (i.e., symmetric optical splitters). In the illustrated embodiment a first optical splitter 142A has a 95/5% splitting ratio, a second optical splitter 142B has a 90/10% splitting ratio, a third optical splitter 142C has a 15%-85% splitting ratio, a fourth optical splitter 142D has a 80/20% splitting ratio, a fifth optical splitter 142E has a 70/30% splitting ratio, and a sixth optical splitter 142F has a 60/40% splitting ratio. It should be understood that embodiments are not limited to any particular splitting ratio.

Figure 4:
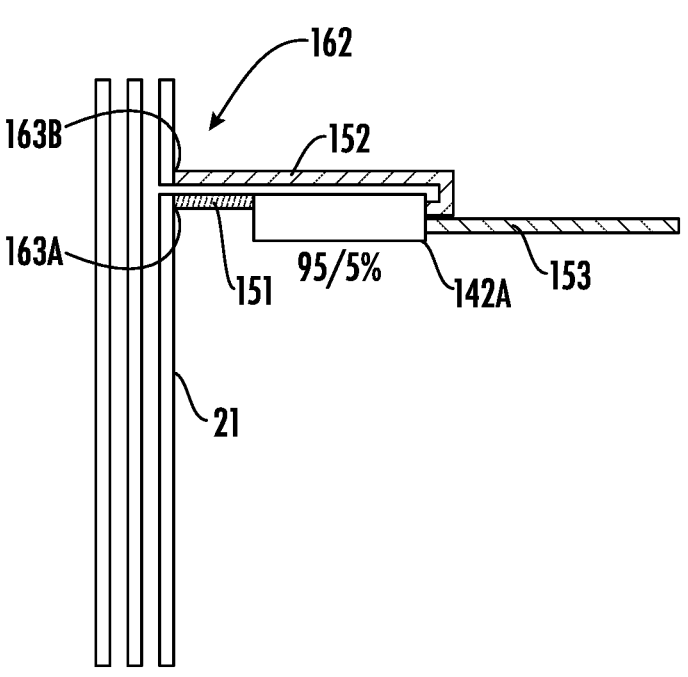
FIG. 4 illustrates a single optical splitter and a distribution fiber of the example optical communications network of FIG. 3 according to one or more embodiments described and illustrated herein.
Figures 5, 6:
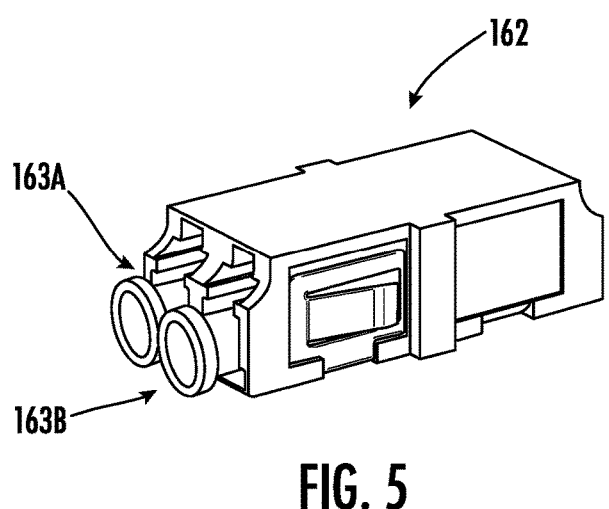
FIG. 5 illustrates an example duplex connector according to one or more embodiments described and illustrated herein.
FIG. 6 illustrates an example multiport having an optical splitter device with a duplex connector according to one or more embodiments described and illustrated herein.
Figure 7:
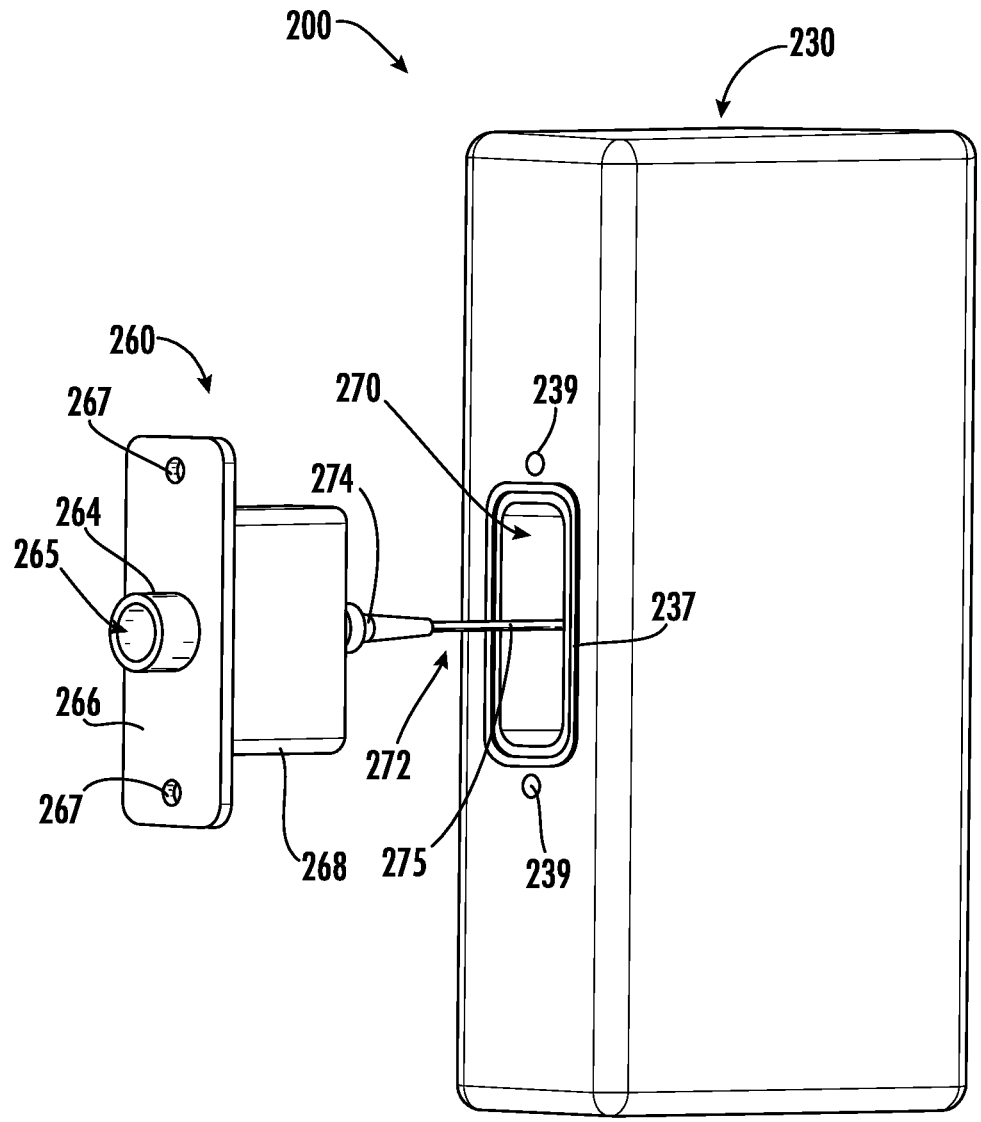
FIGS. 7-10 illustrate an example multiport and a removable cassette housing having and optical splitter and a duplex connector according to one or more embodiments described and illustrated herein.

FIG. 4 is a close-up view of a first optical splitter 142A. Referring to both FIGS. 3 and 4, in embodiments of the present disclosure, the optical splitters 142A-142F are advantageously coupled to a connector having two connection points, i.e., a duplex connector 162). The duplex connector may be any connector style capable of connecting at least two optical fibers, such as a duel ferrule connector or single fiber ferrule, such as a two fiber MPO fiber optic connector. FIG. 5 illustrates a non-limiting duplex connector 162 configured as a duplex SC connector. The example duplex connector includes an input connection point 163A configured as a first connector and a pass-through connection point 163B configured as a second connector. Other connector types providing two optical connection points are also possible.

The input connection point 163A is optically coupled to an input of the first optical splitter 142A by an input waveguide 151, which may be one or more of an optical fiber and an embedded waveguide of a planar lightwave circuit, for example. The pass-through connection point 163B is optically coupled to pass-through output of the first optical splitter by a pass-through waveguide 152, which may be one or more of an optical fiber and an embedded waveguide of a planar lightwave circuit, for example. The remaining optical splitters 160B-160F are similarly coupled duplex connectors 162.

The pass-through waveguide 152 is also referred to herein as a "loop back" waveguide because it changes direction and allows the pass-through optical signal to be provided back into the distribution cable to be provided to the next access point. By utilizing a duplex connector 162, the craft need only make one connection to optically connect both the input of the optical splitter 142A-142F and the pass-through output of the optical splitter 142A-142F to the distribution network. Thus, multiple connections are not required, such as multiple optical connector connections or fiber splicing. The duplex connector 162 provides both the input optical signal and the pass-through optical signal in a single connection.

Referring once again to FIG. 3, the distribution network further includes a plurality of multiports 100A-100F each having a housing 130 defining an enclosure in which a 1×N optical splitter 148 is disposed. In the illustrated embodiment, the 1×N optical splitters are 1×8 optical splitters;

however, it should be understood that N may be equal to numbers other than eight in embodiments. An input of each optical splitter 148 of the plurality of multiports 100A-100F is optically coupled to a network output of the plurality of optical splitters 160A-160F by a network waveguide 153, which may be a defined by one or more of optical fibers and an embedded waveguide of a planar lightwave circuit, for example. In some embodiments, the network waveguide 153 may be at least partially defined by an optical fiber within the intermediate cable assembly 108.

In embodiments of the present disclosure, the optical splitters 160A-160F may be provided at any location from the access points 106A-106F to the respective multiports 100A-100F. As described in more detail below and referring to FIG. 2, the optical splitters 160A-160F may be disposed within the first connector 109, within the intermediate cable assembly 108, within the second connector 111, within the multiport 100, or within any other enclosure of the network.

Referring now to FIG. 6, an example embodiment wherein the optical splitter 242 is provided within a multiport 200 is schematically illustrated. In this embodiment, the intermediate cable assembly (e.g., the intermediate cable assembly 108 shown in FIG. 2) includes two optical fibers. A first optical fiber propagates the input optical signal from the distribution cable 20, and a second optical fiber propagates the pass-through optical signal back to the distribution cable 20.

The example multiport 200 of FIG. 6 includes a multiport housing 230 and may take on any configuration. As a non-limiting example, the multiport may be configured as an OptiSheath® multiport terminal sold by Corning Optical Communications of Charlotte, North Carolina The output ports 149A-149H ports are located at an exterior wall of the housing 130 and are configured to receive connectors of cable assemblies (not shown) that route optical signals to users of the optical communication network. Embodiments are not limited by the style and configuration of the output ports 149A-149H. As a non-limiting example, the output ports 149A-149H may be configured as OptiTap® bulkhead adapters manufactured by Corning Optical Communications. In the illustrated example, a 1×8 optical splitter 248 is disposed within an enclosure 231 defined by the multiport housing 230. However, any 1×N optical splitter may be utilized. Splitter outputs 257A-257F of the 1×8 optical splitter 148 are optically coupled to output ports 249A-249F. The output ports 249A-249F may take on any configuration.

The optical splitter 142 is disposed within the multiport 200. The optical splitter 142 may be an asymmetric optical splitter, as described above. In some embodiments, the optical splitter 142 is permanently disposed within the enclosure 231 defined by the multiport housing 230. However, as described in more detail below, in other embodiments, the optical splitter 142 is removably coupled to the multiport 200, which enables the multiport to be field-configurable by swapping out optical splitters having different optical power split ratios. In either case, the multiport 200 includes a duplex connector 262 that is accessible at the multiport housing 230 and has an input connection point 263A and a pass-through connection point 263B. An input waveguide 251 optically couples the input connection point 263A to the input of the optical splitter 242. A pass-through waveguide 252 optically couples the pass-through connection point 463B to the pass-through output of the optical splitter 242. A network waveguide 253 is optically coupled to the network output of the optical splitter 242. In embodiments where the optical splitter 242, the input waveguide 251, the pass-through waveguide 252, and the network waveguide 253 are permanently disposed within the enclosure 231 of the multiport housing 230, the network waveguide 253 may extend all the way to the 1×8 optical splitter 248 so that the network waveguide 253 optically couples an input of the 1×8 optical splitter 248 to the network output of the optical splitter 142.

As stated above, in some embodiments the optical splitter 242 is removably coupled to the multiport 200. Referring to FIG. 6, the optical splitter 242, the input waveguide 251, the pass-through waveguide 252, and the network waveguide 253 are disposed within a cassette housing 260. The multiport housing 230 defines a cavity 270 into which the cassette housing 260 is positioned. One or more locking features may be provided that removable lock the cassette housing 260 within the cavity 270. The duplex connector 262 is coupled to a first end of the cassette housing 260.

The network waveguide 253 is a first network waveguide disposed within the cassette housing 260 and terminating at a multiport connector 273 at a second end of the cassette housing 260. The cavity 270 terminates at a rear wall 279. A splitter input connector 274 is provided at the rear wall 279 which is configured to mate with the multiport connector 273 when the cassette housing 260 is disposed within the cavity 270. A second network waveguide 275 is disposed within the enclosure 231 and optically couples the splitter input connector 274 to an input of the 1×N optical splitter 248. The second network waveguide 275 may be any waveguide, such as an optical fiber or an embedded waveguide of a planar lightwave circuit, for example. The splitter input connector 274 and the multiport connector 273 may be any type of connector.

Because the cassette housing 260 is removable from the cavity, the optical power split ratio of the multiport 200 may be established in the field by changing out the cassette housing 260. The craft may carry different cassettes of different optical power split ratios to insert in the field. Because the cassette housings 260 are much smaller than the multiport 200 itself, the volume of components the craft needs to transport is significantly reduced. Additionally, only one SKU number needs to be established for the multiport 200, which reduces inventory space requirements because the multiport 200 is a much larger component than the cassette housings 260.

Figure 8:
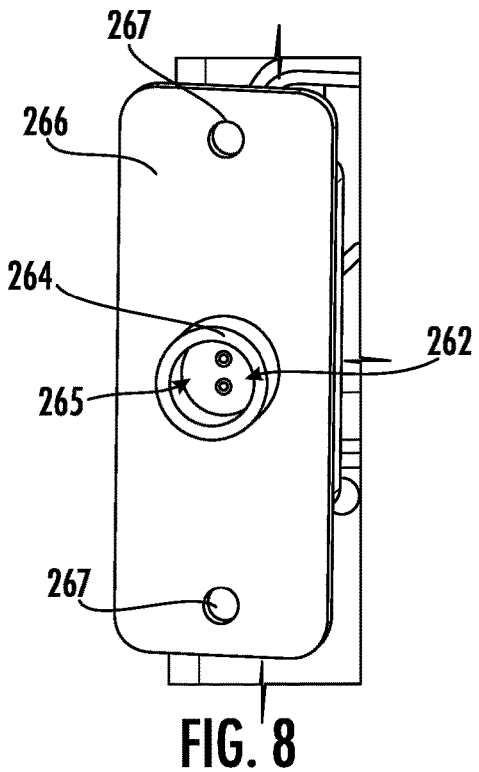

FIGS. 7-10 are different views of an example multiport 200 and example cassette housing 260 according to the schematic illustrated by FIG. 6. The example cassette housing 260 includes a main body 268 and a flange 266. A receptacle body 264 extends from the flange 266 and defines a receptacle opening 265 for receiving a connector, such as the second connector 111 shown in FIGS. 2 and 9. As best shown in FIG. 8, the duplex connector 262 is accessible within the receptacle opening for mating with the second connector 111.

In embodiments, the optical power splitting ratio may be provided on the flange, such as in a unique color.

Figure 9:
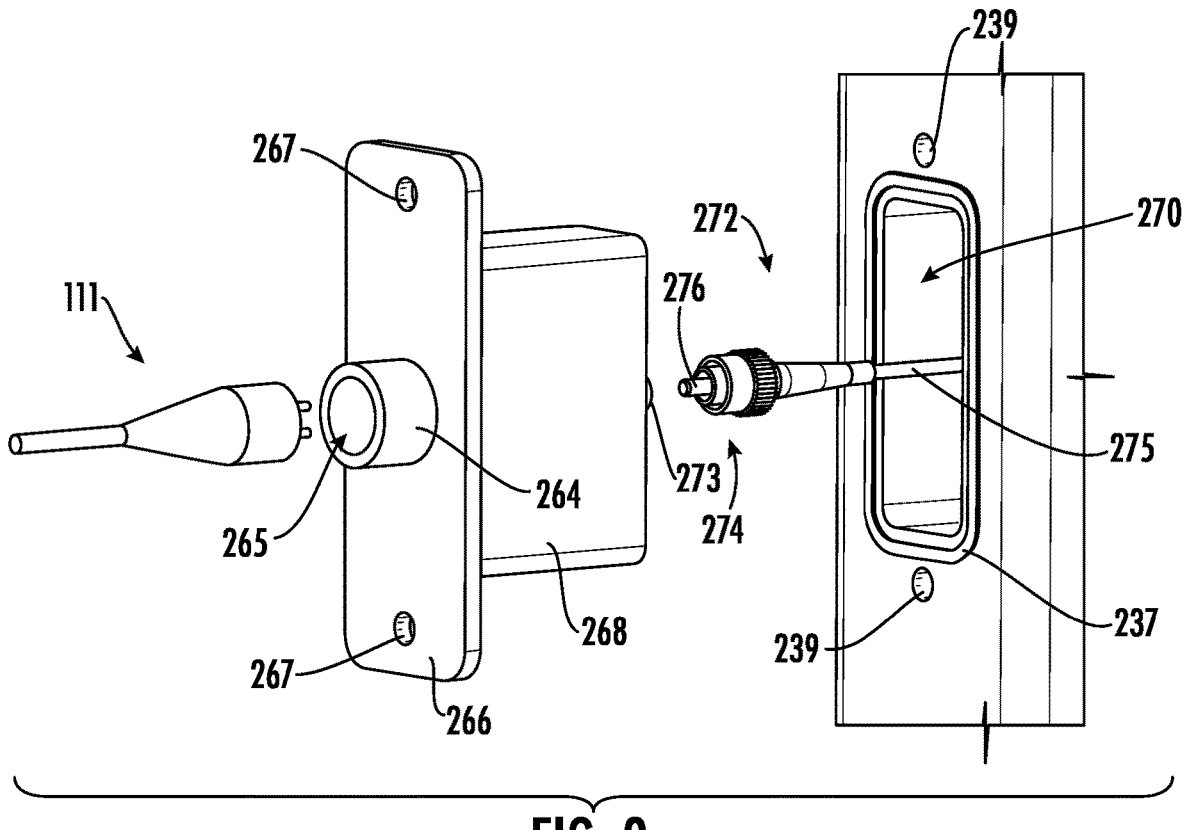

The multiport connector 273 is provided at an end (i.e., a rear end) of the main body 268, as shown in FIG. 9. The multiport connector 273 may be configured as any type of single fiber connector, such as an SC or an LC connector.

The cavity 270 of the illustrated embodiment is surrounded by a sealing element 237, such as a gasket or an O-ring. When the cassette housing 260 is disposed in the cavity 270, the flange 266 presses against the sealing element 237, thereby environmentally sealing the cavity and the internal components of the cassette housing 260. Holes 267 with the flange 266 and corresponding holes 239 within the multiport housing 230 may receive fasteners (e.g., screws) to secure the cassette housing 260 within the cavity 270.

The second network waveguide 275 is provided by a splitter input cable assembly 272 wherein the second network waveguide 275 is an optical fiber within the splitter input cable assembly. A slitter input connector 274 having a ferrule 376 is coupled to the splitter input optical fiber. To optically couple the optical splitter 242, which is disposed within the main body 268, to the 1×N optical splitter of the multiport 200, the craft connects the splitter input connector 274 to the multiport connector 273, positions the main body 268 and the excess optical cable within the cavity 270, and secures the flange 266 to the multiport housing 230 by fasteners.

Figure 10:
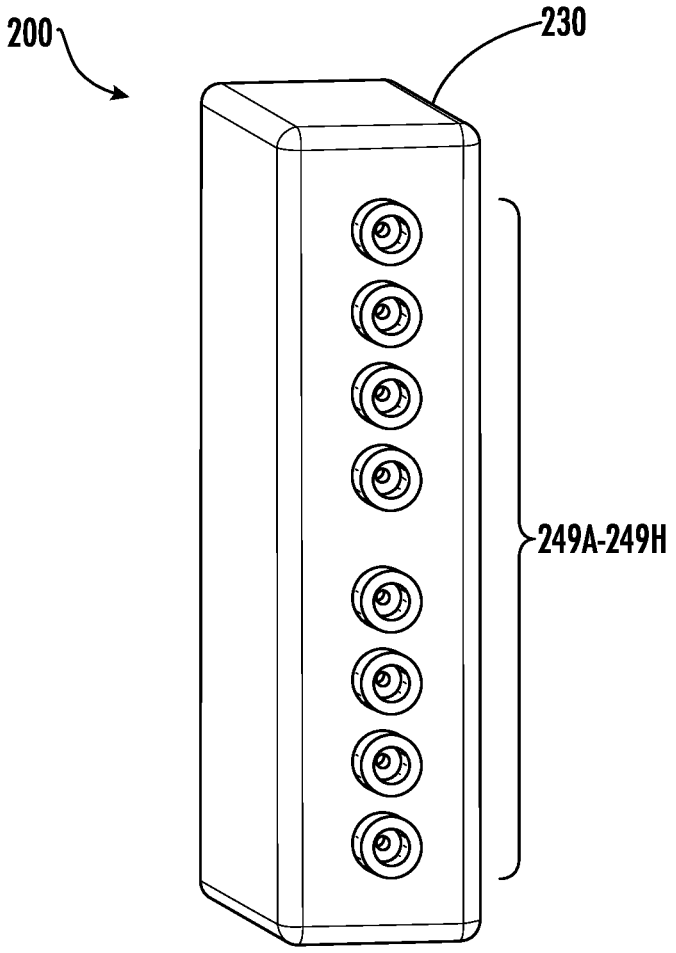

FIG. 10 illustrates example output ports 249A-249H that may be coupled to drop cable assemblies that are then routed to a plurality of subscribers. It should be understood that embodiments are not limited to the multiport configuration as shown in FIGS. 7-10. For example, the multiport 200 may be configured as an OptiSheath® multiport terminal.

Figure 11:
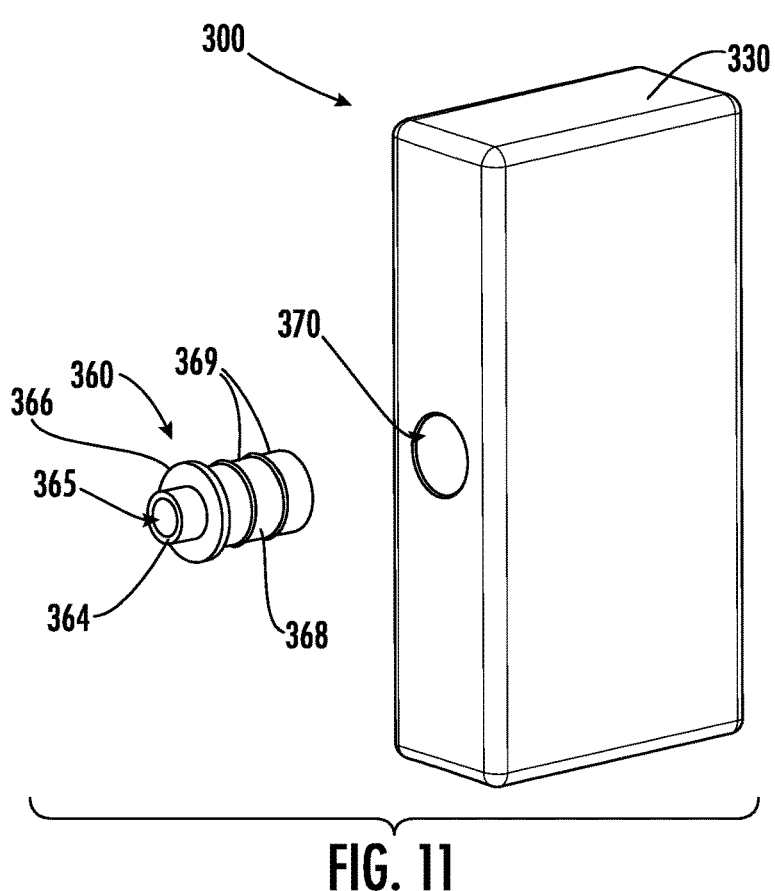
FIGS. 11 and 12 illustrate another example multiport and a removable cassette housing having an optical splitter and a duplex connector according to one or more embodiments described and illustrated herein.
Figure 12:
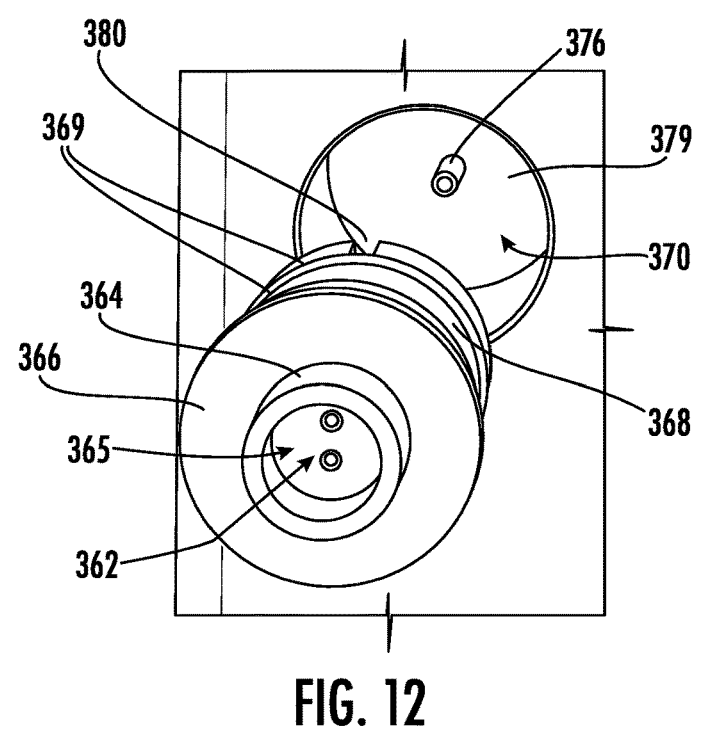

Other configurations for the cassette housing are also possible. FIGS. 11 and 12 illustrate another example cassette housing 360 and multiport 300. The cassette housing 360 has a cylindrically shaped main body 368 and a circularly shaped flange 366. A receptacle body 364 extends from the flange 366 that defines a receptacle opening 365. A duplex connector 362 is accessible within the receptacle opening and configured to receive a connector, such as the second connector 111 shown in FIG. 2.

The main body 368 has one or more sealing elements 369, such as O-rings, that are wrapped around the main body 368. The sealing elements 369 seal a cylindrical cavity 370 of the multiport housing 330 and protect components within the cassette housing 360 and the multiport housing 330 from the environment. In some embodiments, the main body 368 includes a keying feature 380 that mates with a corresponding keying feature (not shown) within the cavity 370 to ensure that the cassette housing 360 is inserted into the cavity 370 in the proper orientation.

Figure 13:
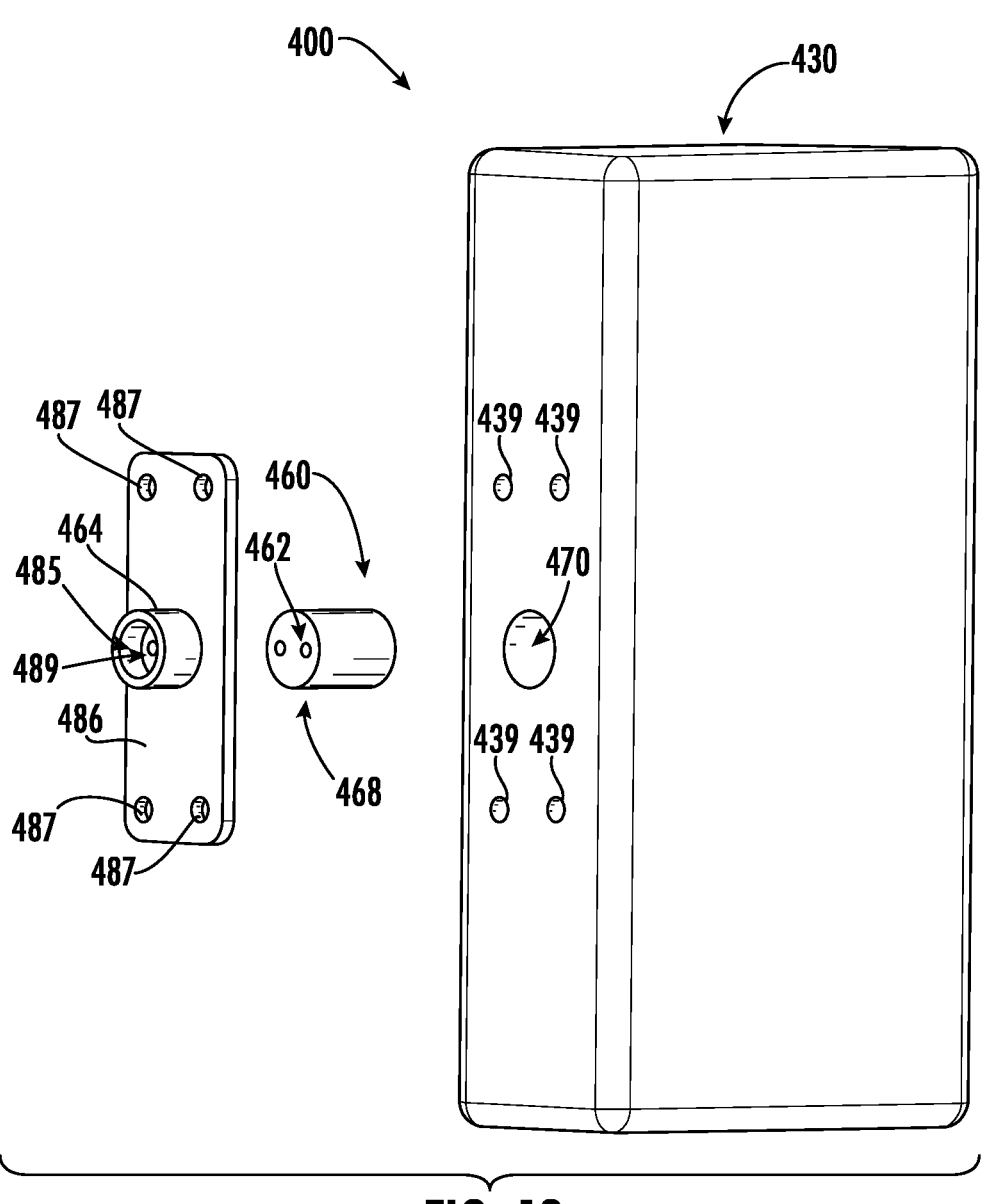
FIG. 13 illustrates another example multiport and a removable cassette housing having an optical splitter and a duplex connector according to one or more embodiments described and illustrated herein.

In the embodiment of FIGS. 12 and 13, the splitter input connector is configured as a splitter input ferrule 376 positioned at a rear wall 379 of the cavity 370. A multiport mating connection point (not shown) is provided at a rear end of the main body 368 that is configured to mate with the splitter input ferrule 376 when the cassette housing 360 is inserted into the cavity 370 to optically couple the network output of the optical splitter with the input of the 1×N splitter. It should be understood that the multiport 300 could have a splitter input cable assembly 272 as illustrated in FIG. 9 instead of only the splitter input ferrule 376, or the splitter input ferrule 376 may be used in place of the splitter input cable assembly 272 in the embodiments illustrated by FIGS. 7-9.

FIG. 13 illustrates an embodiment that is a variation of the embodiment illustrated by FIGS. 12 and 13. The example multiport 400 includes a multiport housing 430 having a cylindrical cavity 470 and holes 439 for receiving fasteners.

The cassette housing 460 comprises a cylindrical main body 460 that acts as an insert. The optical splitter and associated waveguides are disposed within the cylindrical main body 460. The duplex connector 462 is provided at an end of the cylindrical main body 460. In this embodiment, the receptacle is not provided by the cassette housing 460. Thus, the cassette housing 460 is reduced in size as compared to other embodiments.

The receptacle is defined by a bulkhead or cover 480 comprising a flange 486 with four holes 487 for securing the cover 480 to the multiport housing 430, and a receptacle 484 extending from the flange 466. The receptacle 484 defines a receptacle opening 485 for receiving a connector, such as the second connector of FIG. 2. The receptacle opening has a rear wall that also includes one or more openings 489 for providing access to the duplex connector 462 of the cassette housing 468.

The craft inserts the cassette housing 468 configured as an insert into the cavity 470 and then secures the cover 480 to the multiport housing 430 by inserting fasteners into holes 487 and holes 439. One or more sealing elements may be provided for environmental sealing.

Figure 14:
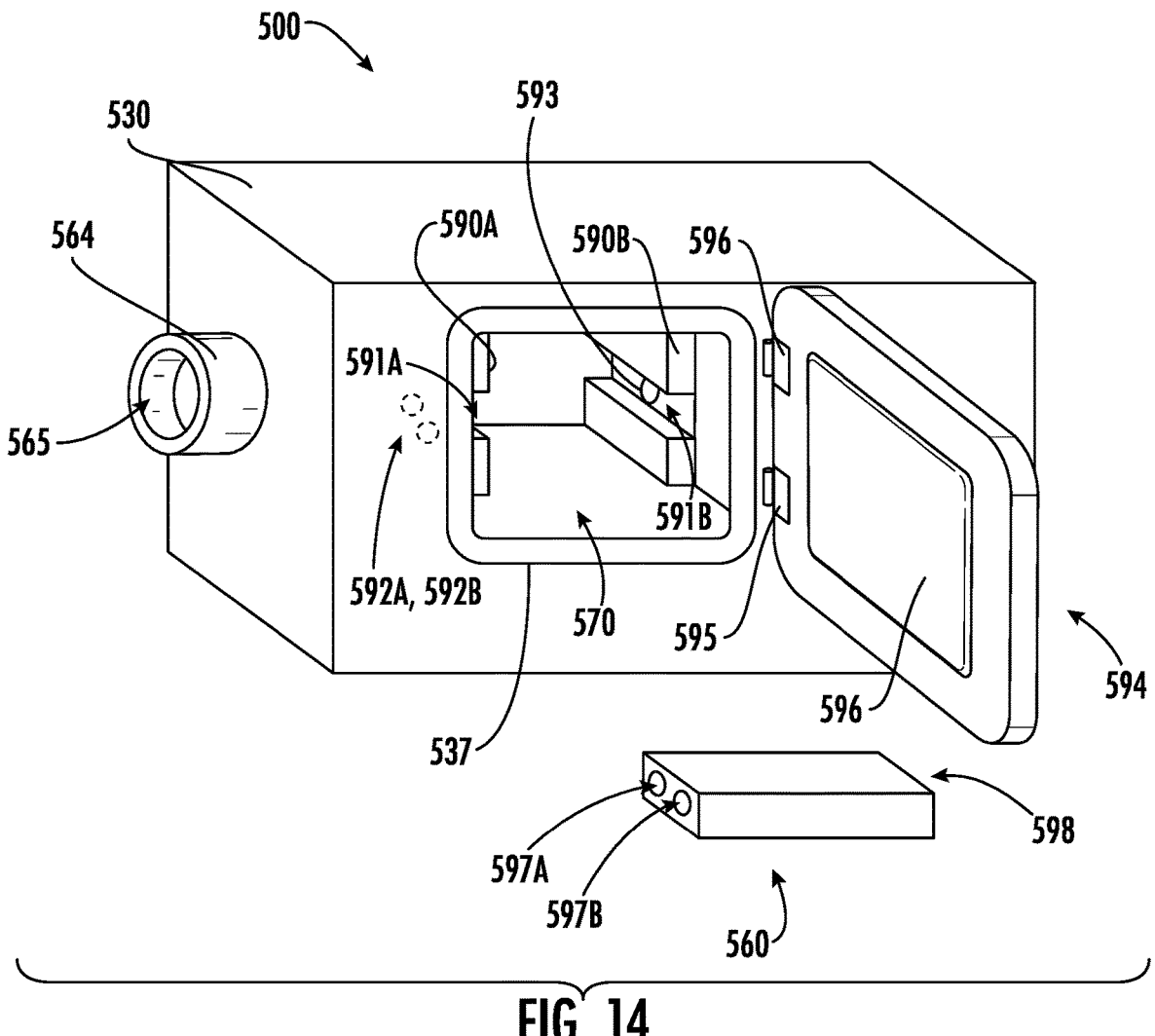
FIG. 14 illustrates an example multiport with a cover sealing a cavity and a removable cassette housing having an optical splitter and a duplex connector according to one or more embodiments described and illustrated herein.

FIG. 14 shows another example cassette housing 560 and multiport 500. The multiport 500 includes a multiport housing 530 having a receptacle 564 extending therefrom. The receptacle 564 defines a receptacle opening 565 for receiving a connector, such as the second connector of FIG. 2. In this example, the multiport housing 530 defines a cavity 570 that is accessible from an exterior of the multiport housing 530. A cover 594 configured to open to provide access to the cavity 570 and close to provide environmental sealing for the cavity 570 is attached to the multiport housing 530. As an example, hinges 596 are provided to allow the cover 594 to open and close. However, it should be understood that other mechanisms to open and close the cover 594 may be utilized (e.g., sliding mechanisms, latching mechanisms, and the like). The interior surface of the example cover 594 includes a protrusion operable to be seated within an opening of the multiport housing 530 defining the cavity 570 to provide environmental sealing. A sealing element 537 is also provided around a perimeter of the cavity 570 and contacts the interior surface of the cover 594 for additional environmental sealing.

At least one slot (e.g., first slot 591A and second slot 591B) is provided within the cavity 570. The first slot 591A and the second slot 591B in the illustrated embodiment are configured to receive a cassette housing 560 including the optical splitter and associated waveguides. The cassette housing 560 of this embodiment further includes an input lens 597A and a pass-through lens 597B at a first edge and a network output lens 598 at a second, opposite edge. The input lens 597A is optically coupled to the input waveguide within the cassette housing 560, and the pass-through lens 597B is optically coupled to the pass-through waveguide within the cassette housing 560. Additionally, a network waveguide within the cassette housing 560 is optically coupled to the network output lens 598.

The cavity 570 comprises a multiport input lens 592A and a multiport pass-through lens 592B at a first wall 590A proximate the first slot 591A, and a multiport network output lens 593 at a second wall 590B proximate the second slot 591B. The shape of the first slot 591A, the second slot 591B, and the cassette housing 560 are such that, when the cassette housing is inserted into the first slot 591A and the second slot 591B (or a single slot in some embodiments), the multiport input lens 592A is optically coupled to the input lens 597A, the multiport pass-through lens 592B is optically coupled to the pass-through lens 597B, and the network output lens 598 is optically coupled to the multiport network output lens 593. As expanded beam connectors have large tolerances along the direction of propagation of the light, no additional alignment features are required in this direction. Lateral alignment is provided by geometrical features inside the cavity 570. In some embodiments, the cavity 570 may include spring-loaded features that can eject the cassette housing 560 for easy removal.

Figure 15:
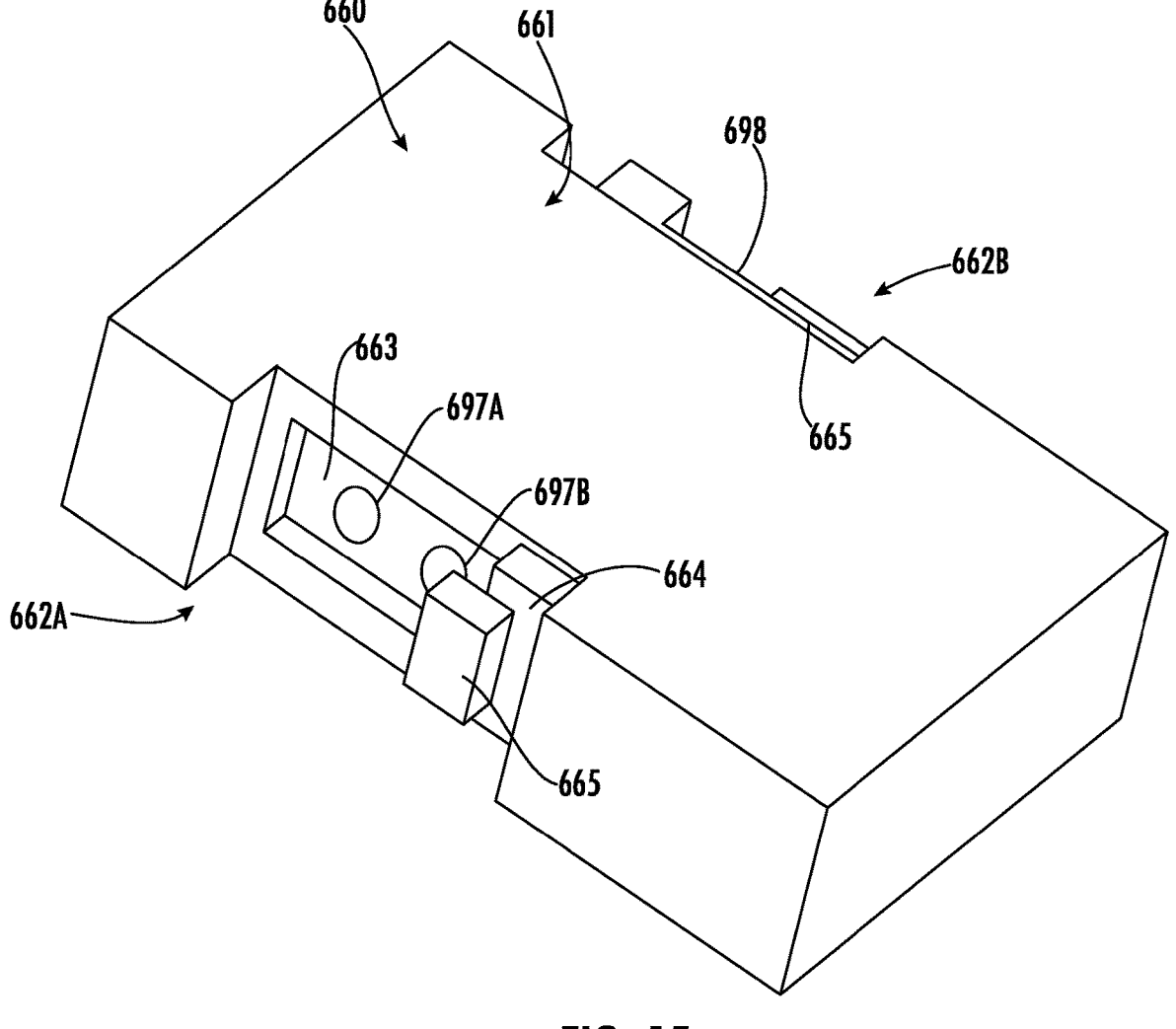
FIG. 15 illustrates an example cassette housing for insertion into the cavity of the multiport of FIG. 14 according to one or more embodiments described and illustrated herein.

FIG. 15 illustrates an example cassette housing 660 operable to be inserted into the cavity 570 shown in FIG. 14. The lenses within the cavity 570 and on the cassette housing 660 may be recessed to avoid contamination or damage through physical contact. Two edges of the example cassette housing 660 include a first notch 662A and a second notch 662B to move the positions of the input lens 697A, the pass-through lens 697B, and the multiport lens 698 inward. In the illustrated embodiment, the input lens 697A and the pass-through lens 697B are disposed within a recess 663 of the first notch 662A to further protect the lenses. The multiport lens 698 may be disposed in a similar recess (not shown).

To further protect the various lenses from physical contact or debris, sliding doors 664 may be disposed in pockets adjacent the first notch 662A and the second notch 662B. The doors 664 may be slid out of the pockets to cover the first notch 662A and the second notch 662B to protect the lenses therein. In some embodiments, the doors 664 may be biased in the closed position by one or more bias features (e.g., springs). A mechanical feature 665 may be provided on each door to ease the opening of the doors 664 and also to with corresponding mechanical features (not shown) within the cavity 670 such that the doors 664 automatically open when the cassette housing 660 is inserted into the cavity 670, and automatically closed when the cassette housing 660 is removed from the cavity 670.

In some embodiments, electrical contacts (e.g, pogo pins) are arranged in such a way as to identify to the multiport which optical power split ratio is provided by the inserted cassette housing 660. As a non-limiting example, the electrical contact may cause a visual indicator on the multiport housing (e.g., a light emitting diode) with respect to the optical power ratio. As another example, a device operated by the craft may be used to interrogate the inserted cassette housing 660 to reveal the optical power split ratio without opening the cover 594.

Figure 16:
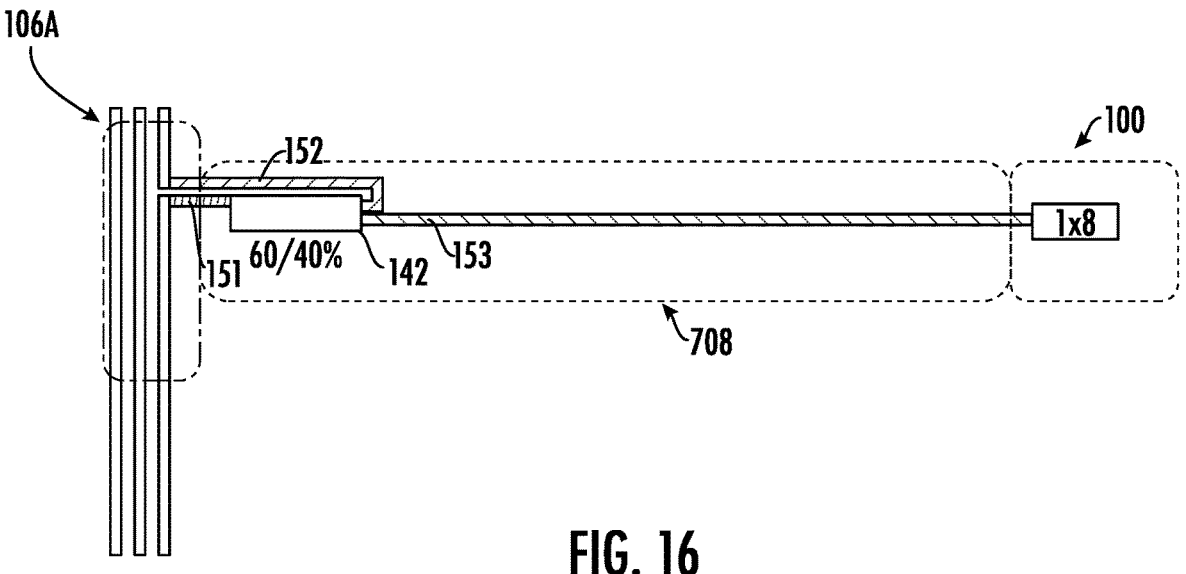
FIG. 16 illustrates an example fiber distribution network including an optical cable assembly incorporating an optical splitter according to one or more embodiments described and illustrated herein.
Figure 17:
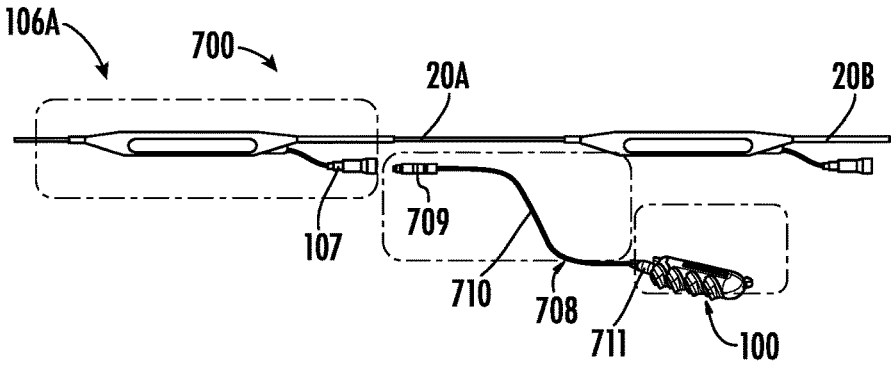
FIG. 17 illustrates the example fiber distribution network of FIG. 16 according to one or more embodiments described and illustrated herein.

The optical splitters may also be provided in locations other than the multiport. Referring now to FIGS. 16 and 17, an example intermediate cable assembly 708 that includes an optical splitter 142 at some point along the length of the optical cable 810 is schematically illustrated. The craft may carry several different intermediate cable assemblies 708 with different optical power split ratios. The craft may then select the cable assembly having the desired optical power split ratio, connect a first connector 709 to the connectorized tether assembly 107 of an access point 106A, and a second connector 711 to a multiport 100. In other embodiments, the intermediate cable assemblies 708 are configured to receive removable cassettes so only one cable assembly part number needs to be inventoried and transported. Thus, a universal multiport 100 is possible, and it is the intermediate cable assemblies 708 that are changed to set the optical power split ratio.

Figure 18A:
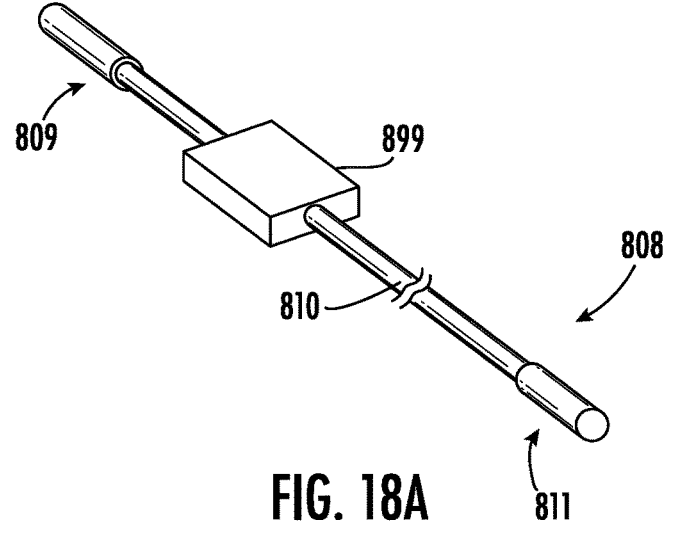
FIG. 18A illustrates an example optical cable assembly with an in-line housing including an optical splitter according to one or more embodiments described and illustrated herein.

Referring now to FIG. 18A, an example cable assembly 808 including an integrated optical splitter is illustrated. The optical cable assembly 808 includes a first connector 809 (e.g., for connecting to a connectorized tether assembly), a second connector 811 (e.g., for connecting to a multiport) and an optical cable 810 between the first connector 809 and the second connector 811. An in-line housing 899 is disposed within the span of the optical cable 810. An optical splitter, an input waveguide, a pass-through waveguide, and a network waveguide are disposed within the in-line housing 899. The in-line housing 899 may be positioned closer to the connector to be connected to the access point because two optical fibers are needed between the connector connected to the access point and the in-line housing 899 for propagating the input optical signal and the pass-through optical signal. Reducing the amount of fiber for the pass-through optical signal may reduce the cost of the optical cable assembly 808. In the embodiment illustrated by FIG. 18A, the first connector 809 is a duplex connector that optically couples two optical fibers for the input optical signal and the pass-through optical signal to the connectorized tether assembly of the access point.

The in-line housing 899 may be configured to be opened to swap out optical splitters, or it may be a permanent, non-openable enclosure. For example, the in-line housing may be overmolded with respect to the optical cable 810.

Figure 18B:
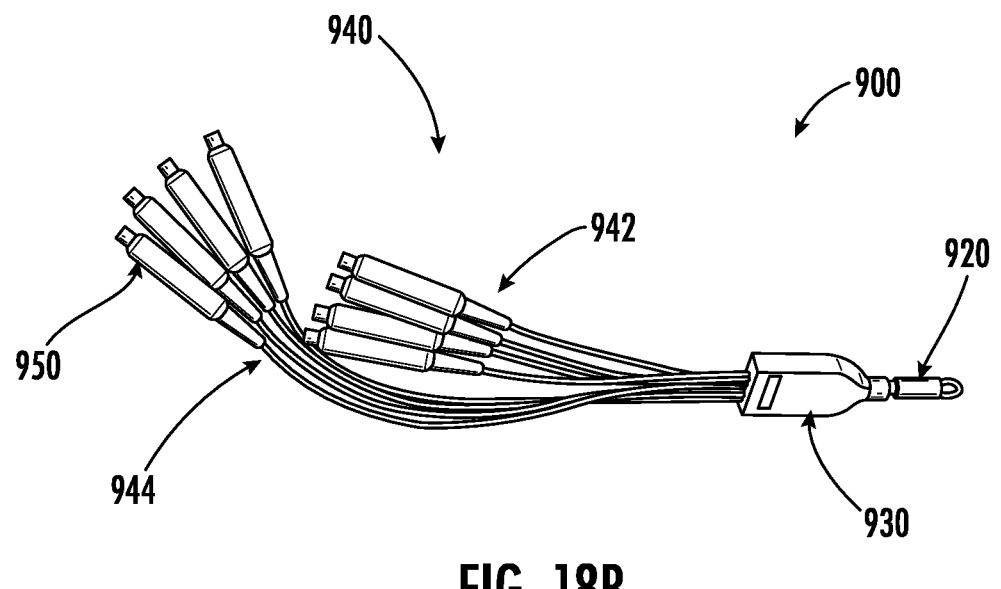
FIG. 18B illustrates an example optical cable assembly with an in-line housing including a plurality of output legs according to one or more embodiments described and illustrated herein.

Referring now to FIG. 18B, an example cable assembly 900 is illustrated. In the illustrated example, the cable assembly 900 includes an input connector 920 configured as a duplex connector (e.g., an SC connector, an MPO connector, and the like). The cable assembly 900 further includes an in-line housing 930 that defines an enclosure. In some embodiments the input connector 920 is coupled to the in-line housing 930 by a tether cable (not shown). In other embodiments, the input connector 920 is directly attached, or integral with, the in-line housing 930.

An optical splitter, an input waveguide, a pass-through waveguide, a network waveguide, and a 1×N optical splitter are disposed within the in-line housing 930. In the illustrated embodiment, the 1×N optical splitter is a 1×8 optical splitter. Extending from the in-line housing 930 are a plurality of output cable legs 940. Each output cable leg 940 includes an optical fiber that is in optical communication with, or is otherwise optically coupled to, an individual output of the 1×N optical splitter, and is terminated by an output connector 950, which may be hardened connector, for example. In the illustrated embodiment, there are eight output cable legs 940 that are arranged in a first subset 942 and a second subset 944 that are of different lengths. The first and second subsets may make it easier to organize the output cable legs or reach desired locations. The output cable legs 940 may have any length depending on the application.

In some embodiments, the optical splitter is removable from the in-line housing 930. For example, the enclosure of the in-line housing 930 is accessible so that the craft may install or exchange a new optical splitter having a desired optical power splitting ratio. As another example, the optical splitter may be disposed in a cassette housing that can be removably installed in the in-line housing, such as the cassette housings as illustrated FIGS. 6-15. In this manner, the optical power splitting ration may be modified in the field as-needed. The embodiment of FIG. 18B may be smaller in size than, and replace, a traditional multiport device.

Figures 19, 20:
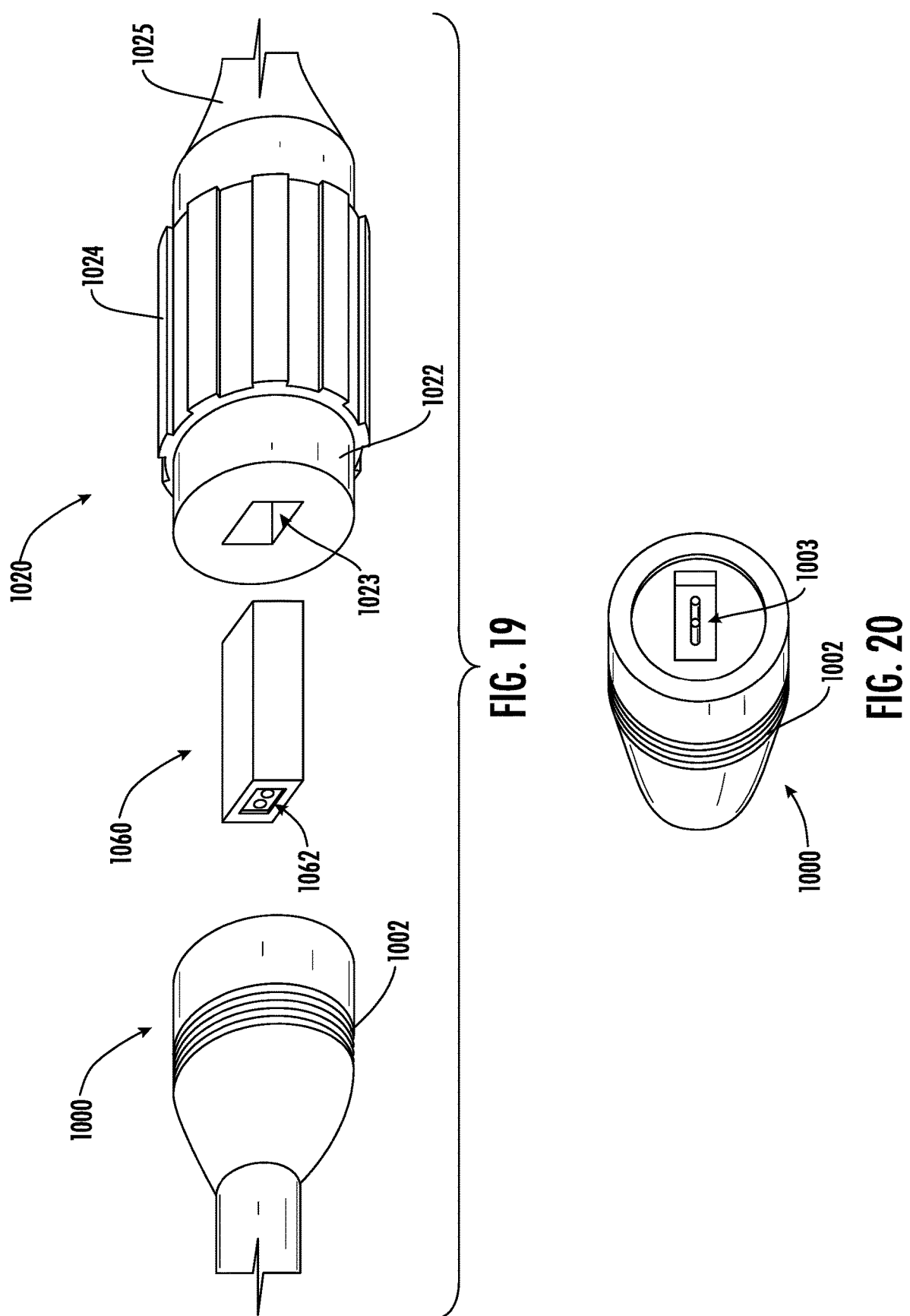
FIG. 19 illustrates an example optical connector configured to receive an cassette housing including an optical splitter according to one or more embodiments described and illustrated herein.
FIG. 20 illustrates a mated optical connector configured to mate with the optical connector of FIG. 19 according to one or more embodiments described and illustrated herein.

The optical splitter may also be provided in an optical connector itself, either in a removable or a non-removable manner. Referring to FIG. 19, an example optical connector 1020 having an insertable cassette housing 1060 is illustrated. The cassette housing includes a duplex connector 1062, an optical splitter, an input waveguide, a pass-through waveguide, and a network waveguide. The example optical connector 1020 includes a body 1022 having a front face 1021 and a coupling nut 1024 that is free to rotate about the body 1022. The coupling nut 1024 also includes interior threads (not shown) to mate with exterior threads 1002 of a mated optical connector 1000. The example optical connector 1020 may be either a connector of an optical cable assembly or an input connector of a multiport, for example.

A cavity 1023 is positioned within the front face 1021 of the body 1022. The cavity 1023 is configured to receive the cassette housing 1060. The cassette housing also includes a cable assembly connector (not shown) at an end opposite from the end having the duplex connector. A splitter input connector configured as a splitter input ferrule (not shown) similar to the splitter input ferrule 376 of FIG. 12 is provided at a rear wall of the cavity. The cassette housing 1060 is inserted into the cavity 1023 such that the cable assembly connector mates with the splitter input connector to optically couple the network output of the optical splitter with the network optical fiber when the cassette housing is disposed within the cavity.

Referring to FIG. 20, the mated optical connector 1000 includes a corresponding duplex connector 1004 having ferrules that are configured to mate with the duplex connector 1062 of the cassette housing 1060. To mate the mated optical connector 1000 to the optical connector 1020, the duplex connector 1004 of the mated optical connector 1000 is mated with the duplex connector 1062 of the optical connector 1020, and the coupling nut 1024 is rotated to secure the coupling nut 1024 to the exterior threads 1002 of the mated optical connector 1000. In some embodiments, an O-ring 1003 is provided for environmental sealing.

In other embodiments, the duplex connectors, the splitter input connector, and the cable assembly connector are replaced by free-space lenses that pass the input optical signal, the pass-through optical signal, and the network optical signal between the mated optical connector 1000, the cassette housing 1060, and the optical connector 1020.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. An optical device comprising:
an enclosure;
an optical splitter comprising an input, a network output, and a pass-through output, wherein the optical splitter is configured to split an input signal received at the input into a network optical signal at the network output and a pass-through output signal at the pass-through output for propagating the pass-through output signal;
a 1×N optical splitter;
a network waveguide configured to optically couple the network output to an input of a 1×N optical splitter;
a duplex connector comprising an input connection point and a pass-through connection point, and the duplex connector being accessible at the enclosure;
an input waveguide optically coupling the input connection point to the input of the optical splitter; and
a pass-through waveguide optically coupling the pass-through connection point to the pass-through output of the optical splitter wherein the optical splitter, the input waveguide, the pass-through waveguide, the network waveguide, and the 1×N optical splitter are disposed within the enclosure.

2. The optical device of claim 1, wherein the optical splitter, the input waveguide, and the pass-through waveguide are at least partially defined by a planar lightwave circuit.

3. The optical device of claim 1, wherein the input waveguide and the pass-through waveguide are provided by a first optical fiber and a second optical fiber, respectively.

4. The optical device of claim 1, wherein
the enclosure comprises a multiport housing; and
the duplex connector is accessible at the multiport housing.

5. The optical device of claim 1, further comprising:
a cassette housing;
the enclosure comprising a multiport housing;
a first network waveguide and a second network waveguide configured to optically couple the network output to an input of the 1×N optical splitter;
wherein:
the multiport housing defines a cavity that is accessible from an exterior of the multiport housing;
the optical splitter, the input waveguide, the pass-through waveguide, and the first network waveguide are disposed within the cassette housing;
the duplex connector is coupled to a first end the cassette housing;
the cassette housing is removably disposed within the cavity of the multiport housing; and
the second network waveguide is disposed within the enclosure of the multiport housing.

6. The optical device of claim 5, further comprising:
a splitter input cable assembly comprising a splitter input optical fiber and a splitter input connector coupled to the splitter input optical fiber, wherein the splitter input optical fiber defines the second network waveguide such that the splitter input optical fiber optically couples the splitter input connector to the input of the 1×N optical splitter; and
a multiport connector at a second end of the cassette housing, wherein the first network waveguide is optically coupled to the multiport connector and the multiport connector is configured to mate with the splitter input connector to optically couple the network output of the optical splitter with the input of the 1×N optical splitter.

7. The optical device of claim 5, wherein the cassette housing further comprises a receptacle opening, and the duplex connector is disposed within the receptacle opening.

8. The optical device of claim 5, wherein the cassette housing comprises a flange, and the multiport housing comprises a sealing element disposed around the cavity, and the flange is positioned against the sealing element when the cassette housing is disposed within the cavity.

9. The optical device of claim 5, further comprising N output ports accessible at an exterior of the multiport housing, wherein the N output ports are optically coupled to N outputs of the 1×N optical splitter.

10. The optical device of claim 5, wherein the cassette housing further comprises a sealing element that is configured to be pressed against an interior wall of the cavity of the multiport housing.

11. The optical device of claim 5, further comprising:
a splitter input ferrule positioned at a rear wall of the cavity, wherein the second network waveguide is configured as a splitter input optical fiber disposed within the splitter input ferrule; and a multiport mating connection point at a second end of the cassette housing, wherein the first network waveguide is optically coupled to the multiport mating connection point and the multiport mating connection point is configured to mate with the splitter input ferrule when the cassette housing is inserted into the cavity to optically couple the network output of the optical splitter with the input of the 1×N optical splitter.

12. The optical device of claim 1, further comprising:
a cassette housing;
the enclosure comprising a multiport housing;
wherein:
the multiport housing defines a cavity that is accessible from an exterior of the multiport housing;
the multiport housing further comprises a cover configured to open to provide access to the cavity and configured to close to seal the cavity;
the optical splitter, the input waveguide, and the pass-through waveguide are disposed within the cassette housing;
the duplex connector is provided at the multiport housing; and
the cassette housing is removably disposed within the cavity of the multiport housing.

13. The optical device of claim 12, wherein the cavity comprises at least one slot, and the cassette housing is operable to be inserted into the at least one slot.

14. The optical device of claim 13, wherein:
the cassette housing comprises a first edge and a second edge;
the cassette housing comprises an input lens and a pass-through lens at the first edge and a network output lens at the second edge;
the input lens is optically coupled to the input waveguide, the pass-through lens is optically coupled to the pass-through waveguide;
the cavity comprises a multiport input lens and a multiport pass-through lens at a first wall of the cavity and a multiport network output lens at a second wall of the cavity;
when the cassette housing is inserted into the at least one slot, the multiport input lens is optically coupled to the input lens, the multiport pass-through lens is optically coupled to the pass-through lens, and the multiport network output lens is optically coupled to the network output lens; and
the multiport network output lens is optically coupled to the network waveguide.

15. The optical device of claim 14, wherein the cassette housing further comprises:
a first notch at the first edge and a second notch at the second edge;
a first pocket adjacent the first notch and a second pocket adjacent the second notch;
a first door disposed within the first pocket and configured to be in a closed state that covers the first notch, and be in an open state such that the input lens and the pass-through lens are exposed;
a second door disposed within the second pocket and configured to be in a closed state that covers the second notch, and be in an open state such that the network output lens is exposed.

16. The optical device of claim 15, wherein the first door and the second door are biased in the closed state.

17. The optical device of claim 16, wherein the first door and the second door are configured to move to the open state when the cassette housing is inserted into the cavity.

18. The optical device of claim 12, wherein the cassette housing further comprises one or more electrical contacts configured to provide an indication as to an optical power split ratio of the optical splitter within the cassette housing.

19. The optical device of claim 1, further comprising:
the enclosure comprising a multiport housing;
an input cable assembly extending from the multiport housing, the input cable assembly comprising a multiport input connector;
a first network waveguide and a second network waveguide configured to optically couple the network output to an input of the 1×N optical splitter;
a cassette housing;
wherein:
the multiport input connector defines a cavity that is accessible from an exterior of the multiport input connector;
the optical splitter, the input waveguide, the pass-through waveguide, and the first network waveguide are disposed within the cassette housing;
the duplex connector is coupled to a first end the cassette housing;
the cassette housing is removably disposed within the cavity of the multiport input connector; and
the second network waveguide is disposed within the enclosure of the multiport housing.

20. The optical device of claim 1, further comprising:
an optical cable;
a first connector at a first end of the optical cable and a second connector at a second end of the optical cable, wherein the optical splitter is disposed in one of the optical cable, the first connector and the second connector.

21. The optical device of claim 20, further comprising an in-line housing disposed within the optical cable, wherein the optical splitter is disposed within the in-line housing and the duplex connector is provided in one of the first connector and the second connector.

22. The optical device of claim 1, further comprising:
the enclosure comprising an in-line housing, wherein the duplex connector is coupled to the in-line housing;
a plurality of output cable legs extending from the in-line housing, wherein:
each output cable leg comprises an optical fiber;
the optical fiber of each output cable leg is in optical communication with an individual output of N outputs of the 1×N optical splitter disposed within the enclosure.

23. The optical device of claim 22, wherein the enclosure defined by the in-line housing is accessible.

24. The optical device of claim 22, wherein the optical splitter is removably disposed within the enclosure.

25. The optical device of claim 1, further comprising:
an optical cable comprising a network optical fiber;
a first connector at a first end of the optical cable, the first connector comprising an end face, a cavity within the end face, and a splitter input connector at a rear wall of the cavity;
a cassette housing;
wherein:
the optical splitter, the input waveguide, the pass-through waveguide, and the network waveguide are disposed within the cassette housing;
the duplex connector is positioned at a first end the cassette housing;

the cassette housing further comprises a cable assembly connector at a second end, wherein the network waveguide is optically coupled to the cable assembly connector; and the cassette housing is removably disposed within the cavity of the first connector such that the cable assembly connector mates with the splitter input connector to optically couple the network output of the optical splitter with the network optical fiber when the cassette housing is disposed within the cavity.

26. The optical device of claim 25, wherein the splitter input connector is a ferrule.

27. The optical device of claim 1, wherein the optical splitter is an asymmetric optical splitter.

28. An optical device comprising:
   an optical splitter comprising an input, a network output, and a pass-through output, wherein the optical splitter is configured to split an input signal received at the input into a network optical signal at the network output and a pass-through output signal at the pass-through output;
   a duplex connector comprising an input connection point and a pass-through connection point;
   an input waveguide optically coupling the input connection point to the input of the optical splitter; and
   a pass-through waveguide optically coupling the pass-through connection point to the pass-through output of the optical splitter;
an in-line housing defining an enclosure, wherein the duplex connector is coupled to the in-line housing;
a 1×N optical splitter disposed within the enclosure;
a network waveguide configured to optically couple the network output to an input of the 1×N optical splitter; and
   a plurality of output cable legs extending from the in-line housing, wherein:
each output cable leg comprises an optical fiber;
the optical fiber of each output cable leg is optically coupled to an individual output of N outputs of the 1×N optical splitter;
the optical splitter, the input waveguide, the pass-through waveguide are disposed within the enclosure.

29. The optical device of claim 28, wherein the enclosure defined by the in-line housing is accessible.

30. The optical device of claim 28, wherein the optical splitter is removably disposed within the enclosure.

31. A cassette for insertion into a multiport, the cassette comprising:
   a cassette housing;
   an optical splitter disposed within the cassette housing;
   a duplex connector coupled to the cassette housing, wherein the duplex connector is configured to provide an input signal to an input of the optical splitter and receive a pass-through output optical signal from a pass-through output of the optical splitter, wherein the cassette housing is configured to be inserted into an optical device.

32. The cassette of claim 31, wherein:
   the optical splitter is configured to split the input signal received at the input into a network optical signal at a network output and the pass-through output signal at the pass-through output;
the duplex connector comprises an input connection point and a pass-through connection point;
   the cassette further comprises:

an input waveguide optically coupling the input connection point to the input of the optical splitter; and
a pass-through waveguide optically coupling the pass-through connection point to the pass-through output of the optical splitter;
a network waveguide configured to optically couple the network output to an input of a 1×N optical splitter within the multiport;
the optical splitter, the input waveguide, the pass-through waveguide, and the network waveguide are disposed within the cassette housing.

33. The cassette of claim 31, wherein the cassette housing further comprises a receptacle opening, and the duplex connector is disposed within the receptacle opening.

34. The cassette of claim 31, wherein the cassette housing comprises a flange.

35. An optical connector comprising:
   a body having a front face;
   a cavity disposed within the front face of the body;
   a cassette comprising:
a cassette housing;
an optical splitter disposed within the cassette housing; and
a duplex connector coupled to the cassette housing, wherein the duplex connector is configured to provide an input signal to an input of the optical splitter and receive a pass-through optical signal from a pass-through output of the optical splitter, wherein the cassette housing is configured to be inserted into the cavity.

36. The optical connector of claim 35, wherein:
   the optical splitter is configured to split the input signal received at the input into a network optical signal at a network output and the pass-through output signal at the pass-through output;
the duplex connector comprises an input connection point and a pass-through connection point;
   the cassette further comprises:
an input waveguide optically coupling the input connection point to the input of the optical splitter; and
a pass-through waveguide optically coupling the pass-through connection point to the pass-through output of the optical splitter;
a network waveguide configured to optically couple the network output to an input of a 1×N optical splitter; and
the optical splitter, the input waveguide, the pass-through waveguide, and the network waveguide are disposed within the cassette housing.

37. The optical connector of claim 35, wherein:
   the duplex connector is at a first end of the cassette housing;
   the cassette housing further comprises a cable assembly connector at a second end, wherein the network waveguide is optically coupled to the cable assembly connector;
the body comprises a splitter input connector at a rear wall of the cavity; and
the cassette housing is removably disposed within the cavity of the body such that the cable assembly connector mates with the splitter input connector when the cassette housing is disposed within the cavity.

* * * * *